United States Patent
Sinohara et al.

(10) Patent No.: US 10,523,988 B2
(45) Date of Patent: Dec. 31, 2019

(54) SIGNAGE SERVER, SIGNAGE SYSTEM, AND CONTENT DELIVERY METHOD

(71) Applicant: PANASONIC INTELLECTUAL PROPERTY MANAGEMENT CO., LTD., Osaka (JP)

(72) Inventors: Hiroki Sinohara, Kanagawa (JP); Koichiro Yamaguchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/080,786

(22) PCT Filed: Feb. 20, 2017

(86) PCT No.: PCT/JP2017/006103
§ 371 (c)(1),
(2) Date: Aug. 29, 2018

(87) PCT Pub. No.: WO2017/154538
PCT Pub. Date: Sep. 14, 2017

(65) Prior Publication Data
US 2019/0058912 A1    Feb. 21, 2019

(30) Foreign Application Priority Data

Mar. 11, 2016    (JP) ................ 2016-048511

(51) Int. Cl.
*H04N 21/262* (2011.01)
*G09G 5/00* (2006.01)
*G09F 9/302* (2006.01)

(52) U.S. Cl.
CPC ..... *H04N 21/26216* (2013.01); *G09F 9/3026* (2013.01); *G09G 5/006* (2013.01); *G09G 2330/022* (2013.01)

(58) Field of Classification Search
None
See application file for complete search history.

(56) References Cited

U.S. PATENT DOCUMENTS 9,584,863 B1* 2/2017 Teoh ................ H04N 21/4784
2007/0282898 A1* 12/2007 Stark ................... H04H 20/10
(Continued)

FOREIGN PATENT DOCUMENTS

JP    2014-090295 A    5/2014
JP    2016-177435 A    10/2016

OTHER PUBLICATIONS

International Search Report, dated Apr. 25, 2017, by the Japan Patent Office (JPO) in the corresponding International Application No. PCT/JP2017/006103.

*Primary Examiner* — Alexander Q Huerta
(74) *Attorney, Agent, or Firm* — Greenblum & Bernstein, P.L.C.

(57) ABSTRACT

Signage server includes a content database storing signage content associated with a delivery target signage terminal, a terminal status and storing-up situation management unit acquiring status information indicating a status of the signage terminal from the delivery target signage terminal, and storing acquired status information, and a delivery controller executing delivery control in which a delivery priority policy that defines a priority of delivery to the signage terminal according to the status of the signage terminal is retained in advance, in which, when receiving a delivery instruction, whether to immediately perform delivery is determined based on the status information and the delivery priority policy for every delivery target signage terminal, and in which the delivery to the signage terminal with a positive result is immediately performed and the delivery to the signage terminal with a negative result is postponed.

6 Claims, 17 Drawing Sheets

(56) References Cited

U.S. PATENT DOCUMENTS

| | | | |
|---|---|---|---|
| 2008/0091497 A1* | 4/2008 | Julien | G06Q 10/0631 |
| | | | 705/7.12 |
| 2009/0198816 A1* | 8/2009 | Bannister | G06Q 10/00 |
| | | | 709/225 |
| 2009/0276491 A1* | 11/2009 | Lin | H04L 67/025 |
| | | | 709/204 |
| 2010/0118200 A1* | 5/2010 | Gelman | G06F 3/041 |
| | | | 348/578 |
| 2010/0318419 A1* | 12/2010 | Vieri | G06Q 30/02 |
| | | | 705/14.45 |
| 2012/0114336 A1* | 5/2012 | Kim | H04N 21/41415 |
| | | | 398/106 |
| 2012/0179968 A1* | 7/2012 | Madnick | G06Q 30/02 |
| | | | 715/719 |
| 2014/0222578 A1* | 8/2014 | Poornachandran | |
| | | | G06Q 30/0241 |
| | | | 705/14.61 |
| 2014/0344430 A1* | 11/2014 | Ayanam | H04L 41/0213 |
| | | | 709/223 |
| 2015/0163483 A1* | 6/2015 | Sivertsen | H04N 17/045 |
| | | | 348/177 |
| 2015/0289001 A1* | 10/2015 | Bruneaux | H04N 21/2223 |
| | | | 725/38 |
| 2017/0201797 A1* | 7/2017 | Kwon | H04N 21/4623 |
| 2019/0012982 A1* | 1/2019 | Sinohara | G09G 5/006 |

* cited by examiner

FIG. 4

```
CONTENT ID, CONTENT DATA, REPRODUCTION SCHEDULE, [REPRODUCTION TERMINAL ID]

1000,aaa.zip,10:00-12:00,[100,101]
1000,aaa.zip,12:00-14:00,[102]
1001,bbb.zip,12:00-14:00,[100]
            .
            .
            .
```

FIG. 5

| ITEM | STATUS | DESCRIPTION |
|---|---|---|
| SIGNAGE SERVICE SELECTOR | LIVE | SELECT LIVE IMAGE |
| | SIGNAGE | SELECT SIGNAGE CONTENT |
| SERVICE SELECTOR | SIGNAGE SERVICE | SIGNAGE OR LIVE |
| | OTHER SERVICES | OTHER IMAGE SERVICES VIA CATV, TV, OR THE LIKE PRESENTATION MATERIALS OR THE LIKE |
| DISPLAY PROCESSOR | DISPLAY-ON | DISPLAYING IS TURNED ON |
| | DISPLAY-OFF | DISPLAYING IS TURNED OFF |

FIG. 10A

| ITEM | MANAGEMENT INFORMATION | DESCRIPTION |
|---|---|---|
| CONTENT INFORMATION | CONTENT ID | IDENTIFIER FOR UNIQUELY IDENTIFYING CONTENT |
| | CONTENT OBJECT | MOVING IMAGE, STILL IMAGE, AND THE LIKE |

FIG. 10B

| ITEM | MANAGEMENT INFORMATION | DESCRIPTION |
|---|---|---|
| PLAYLIST INFORMATION | PLAYLIST ID | IDENTIFIER FOR UNIQUELY IDENTIFYING PLAYLIST |
| | CONTENT LIST | LIST THAT IS CREATED BY ARRANGE CONTENT ID'S IN ORDER OF REPRODUCTION |
| SCHEDULE INFORMATION | SCHEDULE ID | IDENTIFIER FOR UNIQUELY IDENTIFYING SCHEDULE |
| | STARTING TIME | REPRODUCTION STARTING TIME |
| | ENDING TIME | REPRODUCTION ENDING TIME |
| | PLAYLIST ID | PLAYLIST THAT IS ASSOCIATED WITH SCHEDULE |
| | TERMINAL ID | TERMINAL THAT IS ASSOCIATED WITH SCHEDULE |

FIG. 12

SIGNAGE TERMINAL MANAGEMENT TABLE

| TERMINAL ID | OPERATIVENESS /NON-OPERATIVENESS STATUS | STATUS OF SIGNAGE SERVICE SELECTOR | STATUS OF SERVICE SELECTOR | STATUS OF DISPLAY PROCESSOR |
|---|---|---|---|---|
| 100 | OK | 0 | 1 | 1 |
| 101 | NG | - | - | - |
| .... | | | | |

FIG. 13

| ITEM | STATUS | | | | | | | |
|---|---|---|---|---|---|---|---|---|
| SIGNAGE SERVICE SELECTOR | LIVE | | | | SIGNAGE | | | |
| SERVICE SELECTOR | SIGNAGE SERVICE | | OTHER SERVICES | | SIGNAGE SERVICE | | OTHER SERVICES | |
| DISPLAY PROCESSOR | DISPLAY-ON | DISPLAY-OFF | DISPLAY-ON | DISPLAY-OFF | DISPLAY-ON | DISPLAY-OFF | DISPLAY-ON | DISPLAY-OFF |
| DELIVERY PRIORITY POLICY | 5 | 7 | 6 | 8 | 1 | 2 | 3 | 4 |

SIGNAGE SERVER, SIGNAGE SYSTEM, AND CONTENT DELIVERY METHOD

TECHNICAL FIELD

The present disclosure relates to a signage server that download-delivers signage content to a signage terminal, a signage system that includes the signage server, and a content delivery method that download-delivers the signage content from the signage server to the signage terminal.

BACKGROUND ART

In recent years, digital signage technologies have been widely used that takes out an advertisement by delivering and reproducing signage content such as a commercial image to a display device, such as a liquid crystal display device, which is installed in event facilities, such as a soccer stadium, a baseball stadium, and a concert hall, commercial facilities, such as a shopping center, a hotel, a movie theater, and an amusement park, public transportation facilities, such as a station and an airport, and the like. The digital signage technology has an advantage in that because signage content is delivered with download delivery or streaming delivery via a network, a change of content can be made in a quick and easy manner. Furthermore, accordingly, the digital signage technology also has an advantage in that advertising can be performed in a more effective or efficient manner when compared with the case of a television CM, an advertisement poster, an advertising board, or the like.

As this digital signage technology, a technology is known that streaming-delivers streaming content from a moving image server to a set-top box and that, for display, outputs the streaming content, which is cached in a storage unit of the set-top box, to a display that is connected to the set-top box (PTL 1). The technology that is disclosed in PTL 1, for example, caches moving image data (the streaming content) in the storage unit at midnight, and thus can provide a stable service that does not depend on a band for a moving image server or a status of a network.

CITATION LIST

Patent Literature

PTL 1: Japanese Patent Unexamined Publication No. 2014-90295

SUMMARY OF THE INVENTION

However, in the digital signage technology in the related art, in a case where the signage content is simultaneously download-delivered to many signage terminals, there is a problem in that it takes a longer time to complete the download delivery to all of the signage terminals that are delivery targets, due to a limited bandwidth of the network, network traffic (congestion), or the like and in that the simultaneous download delivery cannot be performed efficiently. This problem is remarkable, for example, in a facility or a place, such as the soccer stadium or a baseball stadium, where many signage terminals are installed. In the related art, such as PTL 1, the content delivery is finished in advance during a time span at a midnight or the like during which a network is unoccupied, and thus does not cope with the real-time simultaneous download delivery.

A main object of the present disclosure, which is provided in view of the problem in the related art, is to provide a signage server, a signage system, and a content delivery method, in all of which simultaneous download delivery of signage content to many signage terminals is possibly performed efficiently.

According to the present disclosure, there is provided a signage server that download-delivers signage content to a signage terminal, the signage server including: a content database in which signage content associated with the signage terminal that is a delivery target is stored; a terminal status management unit that acquires status information indicating a status of the signage terminal from the signage terminal which is the delivery target and stores the acquired status information; and a delivery controller that executes delivery control in which a delivery priority policy that defines a priority of delivery to the signage terminal in accordance with the status of the signage terminal is retained in advance, in which, when receiving an instruction to deliver the signage content to the signage terminal that is the delivery target, whether or not to immediately perform delivery is determined based on the status information and the delivery priority policy for every signage terminal which is the delivery target, and in which the delivery to the signage terminal which has a positive result of the determination is immediately performed and the delivery to the signage terminal which has a negative result of the determination is postponed.

According to the present disclosure, it is possible that simultaneous download delivery of signage content to many signage terminals is efficiently performed.

BRIEF DESCRIPTION OF DRAWINGS

FIG. 4 is a diagram illustrating an example of data file of signage content.

FIG. 5 is a diagram illustrating a status of the signage terminal.

FIG. 10A is a diagram illustrating an example of content information on the signage content.

FIG. 10B is a diagram illustrating an example of playlist information and schedule information.

FIG. 12 is a diagram illustrating an example of a signage terminal management table.

FIG. 13 is a diagram illustrating an example of a delivery priority policy.

DESCRIPTION OF EMBODIMENTS

Figure 1A:
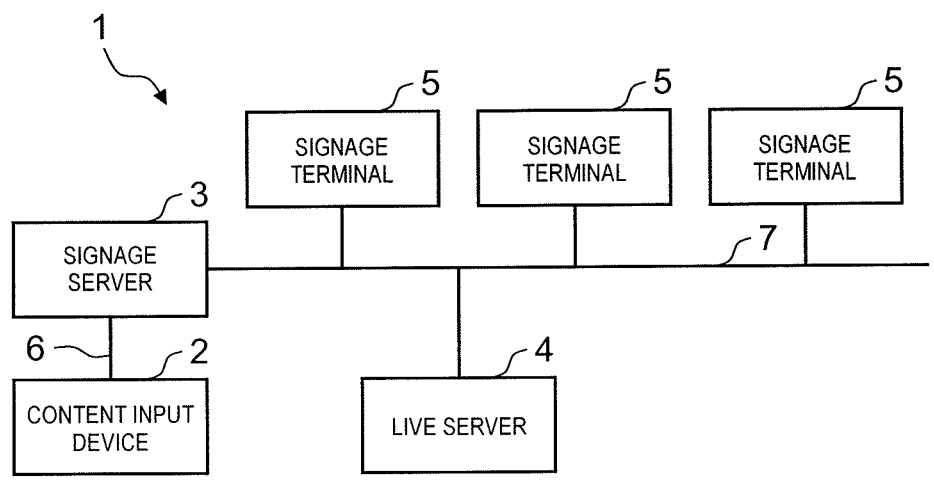
FIG. 1A is a schematic configurational diagram of a signage system according to a first embodiment of the present disclosure.

According to a first disclosure that is provided to solve the problems described above, there is provided a signage server that download-delivers signage content to a signage terminal, the signage server including a content database in which the signage content associated with the signage terminal that is a delivery target is stored, a terminal status management unit that acquires status information indicating a status of the signage terminal from the signage terminal which is the delivery target, and stores the acquired status information, and a delivery controller that executes delivery control in which a delivery priority policy that defines a priority of delivery to the signage terminal in accordance with the status of the signage terminal is retained in advance, in which, when receiving an instruction to deliver the signage content to the signage terminal that is the delivery target, whether or not to immediately perform delivery is determined based on the status information and the delivery priority policy for every signage terminal which is the delivery target, and in which the delivery to the signage terminal which has a positive result of the determination is immediately performed and the delivery to the signage terminal which has a negative result of the determination is postponed.

With the signage server according to the first disclosure, because delivery timing for every signage terminal that is the delivery target can be adjusted (whether to immediately perform or postpone the delivery is determined) according to the status of the signage terminal, it is possible that simultaneous download delivery of the signage content to many signage terminals is efficiently performed.

Furthermore, a second disclosure is that in the signage server according to the first disclosure, the delivery controller determines the order of delivery based on the status information and the delivery priority policy, for the signage terminal, the delivery to which is postponed.

With the signage server according to the second disclosure, because the order of delivery for the signage terminal, the delivery to which is postponed, is determined according to the status of the signage terminal, it is possible that simultaneous download delivery of the signage content to many signage terminals is more efficiently performed.

Furthermore, a third disclosure is that in the signage server according to the first disclosure or the second disclosure, the status of the signage terminal is determined based on at least one among a type of content that is displayed in the signage terminal, turning on or off displaying in the signage terminal, operativeness/non-operativeness of the signage terminal, a reproduction schedule for the signage content in the signage terminal, an installation place of the signage terminal, and a combination of the installation place of the signage terminal and time.

With the signage server according to the third disclosure, it is possible that the delivery timing or the order of delivery for the signage terminal that is the delivery target is suitably determined.

Furthermore, according to a fourth disclosure, there is provided a signage system that includes the signage server according to any one of the first disclosure to the third disclosure and the signage terminal to which the signage content is download-delivered from the signage server.

Furthermore, a fifth disclosure is that in the system according to the fourth disclosure, the signage terminal is configured with a set-top box that performs data communication with the signage server, and a display device on which content that is output from the set-top box is displayed.

Furthermore, according to a sixth disclosure, there is provided a content delivery method that download-delivers signage content from a signage server to a signage terminal, the method including: a step of storing the signage content associated with the signage terminal that is a delivery target; a step of acquiring status information indicating a status of the signage terminal from the signage terminal which is the delivery target and storing the acquired status information; a step of preparing in advance a delivery priority policy that defines a priority of delivery to the signage terminal in accordance with the status of the signage terminal; and a step of executing delivery control in which, when receiving an instruction to deliver the signage content to the signage terminal that is the delivery target, whether or not to immediately perform delivery is determined based on the status information and the delivery priority policy for every signage terminal which is the delivery target, and in which the delivery to the signage terminal which has a positive result of the determination is immediately performed and the delivery to the signage terminal which has a negative result of the determination is postponed.

Embodiments will be described below with reference to the drawings.

First Embodiment

Figure 1B:
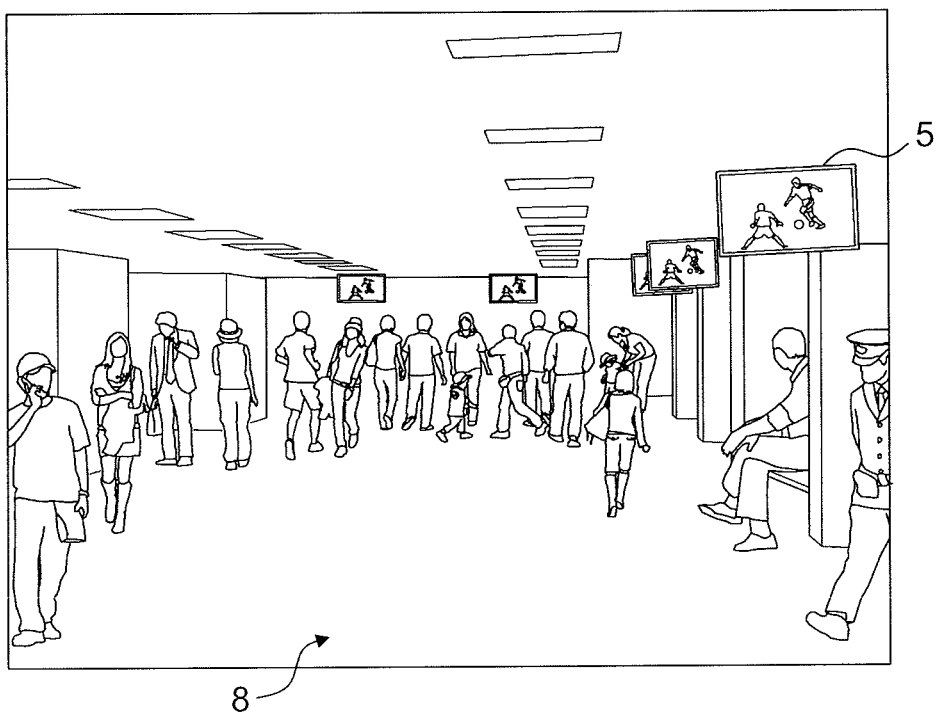
FIG. 1B is a diagram illustrating an application example of the signage system.
Figure 2:
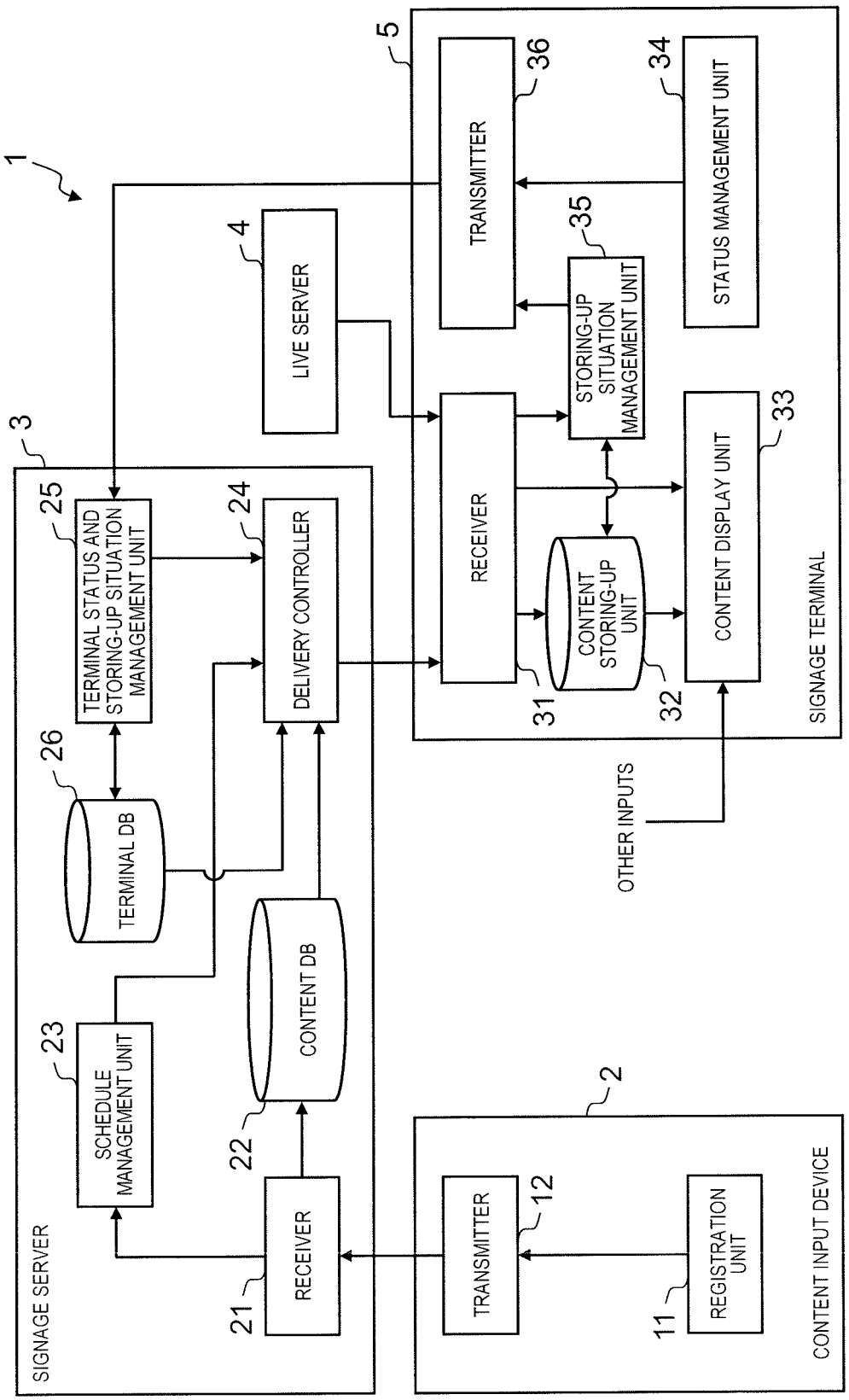
FIG. 2 is a functional block diagram of the signage system.
Figure 3:
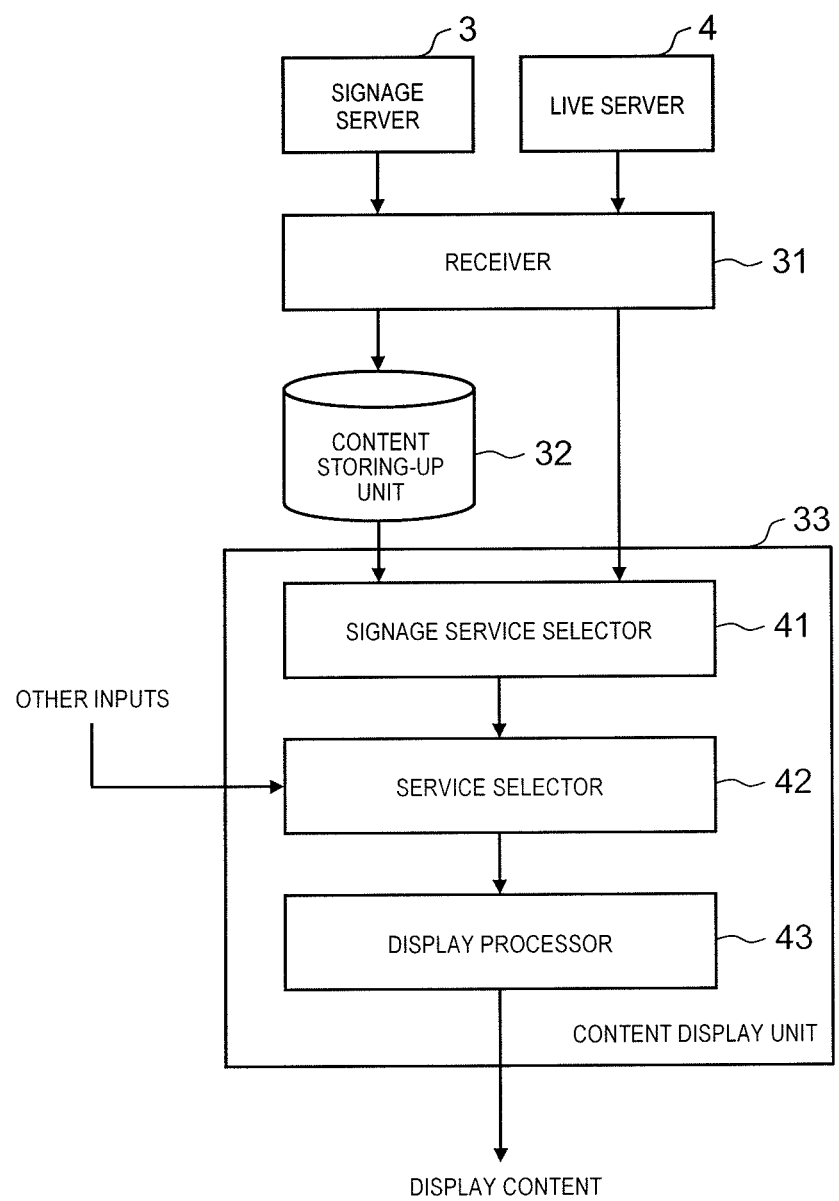
FIG. 3 is a functional block diagram of main portions of a signage terminal that is included in the signage system in FIG. 3.

A signage system according to a first embodiment of the present disclosure will be described with reference to FIGS. 1A to 14. FIG. 1A is a schematic configurational diagram of the signage system according to a first embodiment of the present disclosure. FIG. 1B is a diagram illustrating an application example of the signage system. FIG. 2 is a functional block diagram of the signage system. FIG. 3 is a functional block diagram of main portions of the signage terminal that is included in the signage system in FIG. 2.

Signage system 1 is a system for download-delivering signage content from signage server 3 to signage terminal 5 and reproducing and displaying the signage content in signage terminal 5, and, as illustrated in FIG. 1A, includes content input apparatus 2, signage server 3, live server 4, and signage terminal 5. In an example in FIG. 1A, three signage terminals 5 are illustrated, but the number of signage terminals 5 is not particularly limited. Signage server 3 is connected to content input apparatus 2 via network 6, such as the Internet or a Local Area Network (LAN), in a manner that possibly communicates with each other. However, no limitation to this is imposed, and a configuration may be employed in which a direct connection is made in a manner that possibly performs communication through a well-known communication cable. Furthermore, signage terminal 5 is connected to signage server 3 and live server 4 via network 7, such as the Internet or a Local Area Network (LAN), in a manner that possibly performs communication.

However, no limitation to this is imposed, and a configuration may be employed in which a direct connection is made in a manner that possibly performs communication through a well-known communication cable.

Signage system 1, for example, possibly finds application in event facilities, such as a soccer stadium, a baseball stadium, and a concert hall, commercial facilities, such as a shopping center, a hotel, a movie theater, and an amusement park, public transportation facilities, such as a station and an airport, and the like. A case will be described below where signage system 1 finds application in the soccer stadium. In the present embodiment, signage terminal 5, as illustrated in FIG. 1B, is installed on a pillar or a wall in a space 8 in the building of the soccer stadium, and at a prescribed timing, switches between displaying live images of a soccer game and the signage content. The setting of time for switching between the live image and the signage content may be performed manually by a user, and may be performed automatically according to a schedule that is determined in advance. In an example in FIG. 1B, five signage terminals 5 are installed at suitable places in the space 8 in the building of the soccer stadium. The installation places of signage terminals 5 and the number of installed signage terminals 5 are not particularly limited.

Although not illustrated in detail, each of the constituent apparatuses (content input apparatus 2, signage server 3, live server 4, and signage terminal 5) of signage system 1 has a hardware configuration that includes a Central Processing Unit (CPU) that, in a centralized manner, performs various pieces of information processing operations that is based on a prescribed control program, executes control or the like of peripheral devices, and so forth, a Random Access Memory (RAM) that functions as a working area for the CPU, or the like, a Read Only Memory (ROM) in which a control program that is executed by the CPU, or data is stored, a network interface that performs communication processing via a network, a monitor (an image output device), a speaker, an input device, and a hard disk drive (HDD), and the like. It is possible that at least one or several of the functions of the unit of each of the constituent apparatus are realized by the CPU executing a prescribed control program. At least one or several of the functions of each constituent apparatus may be replaced with processing by other well-known hardware.

The apparatuses, content input apparatus 2, signage server 3, live server 4, and signage terminal 5 that constitute signage system 1 will be described with reference to FIGS. 2 and 3. In FIG. 2, illustrations of networks 6 and 7 that are illustrated in FIG. 1A are omitted in FIG. 2. Furthermore, in the present embodiment, it is assumed that the signage content is a moving image. However, the signage content is not limited to the moving image, and may be a still image, audio, or the like.

Content input apparatus 2 is an apparatus for inputting the signage content into signage server 3, and includes registration unit 11 in which a data file including the signage content and information (hereinafter referred to as "delivery schedule information) that defines a reproduction schedule for the signage content and a reproduction terminal is registered or is updated, and transmitter 12 that transmits the data file which is registered in registration unit 11 or is updated, to signage server 3.

FIG. 4 is a diagram illustrating an example of the data file of the signage content. As illustrated in FIG. 4, the data file of the signage content includes a content ID (for example, "1000") of the signage content, content data (for example, "aaa.zip") on the signage content, a reproduction schedule (for example, "10:00 to 12:00") for the content, and a reproduction terminal ID (for example, "100," or "101") for the content. Because the signage content is download-delivered to a plurality of signage terminals 5, a plurality of reproduction terminals ID can be obtained.

Signage server 3 stores the data file (refer to FIG. 4) of the signage content that is received from content input apparatus 2, and based on the delivery schedule information (the reproduction schedule and the reproduction terminal ID) that is included in the data file download-delivers the signage content to signage terminal 5. Signage server 3 will be described in detail below.

Live server 4 is an image provision server that provides a live image that results from image-capturing a scene of a soccer game with a camera that is installed at a suitable place in the soccer stadium, to signage terminal 5 via network 7. The installation places of the camera and the number of installed cameras are not particularly limited. In the present embodiment, it is assumed that an image of the soccer game that is image-captured by switching between a plurality of cameras is transmitted as a live image to signage terminal 5.

Signage terminal 5 includes receiver 31, content storing-up unit 32, content display unit 33, status management unit 34, storing-up situation management unit 35, and transmitter 36. It is possible that signage terminal 5, for example, is configured with a set-top box that performs the data communication with signage server 3, and a display device on which the content that is output from the set-top box is displayed.

Receiver 31 downloads (receives) the signage content (the content data, the reproduction schedule, and the like) from signage server 3. A result (the signage content) of the download by receiver 31 is stored up (stored) in content storing-up unit 32. Furthermore, in a case where, in signage service selector 41 that will be described below, the live image is selected as a signage service, receiver 31 receives the live image from live server 4 and inputs the received live image into content display unit 33.

Content display unit 33 reproduces the signage content (the content data) that is stored up in content storing-up unit 32, using playlist information and schedule information. Content display unit 33, as illustrated in FIG. 3, includes signage service selector 41, service selector 42, and display processor 43.

Signage service selector 41 is a service that is possibly provided by signage terminal 5, and is selected according to the reproduction schedule for the signage content, an instruction or the like from the user, or the like. In the present embodiment, as the signage service, either "live" that is a service for providing the live image, or "signage" that is a service for providing the signage content is selected. In a case where "live" is selected as the signage service, signage service selector 41 acquires the live image from live server 4 via receiver 31.

In service selector 42, a service that is displayed in signage terminal 5 is selected. Normally, the signage service that is selected in signage service selector 41 is selected as a service that is to be displayed on signage terminal 5, but in a case where the user designates a service other than the signage service, the service (other services) that is designated by the user is selected as a service that is to be displayed on signage terminal 5. Accordingly, for example, it is possible that, in signage terminal 5 that is installed in a VIP room in the soccer stadium, an image service via TV, CATV, or the like, presentation materials, and the like, are displayed. The designation of the service by the user, that is, switching from the signage service to other services, for example, can be performed by switching between HDMI (a registered trademark) input terminals (switching to "other inputs").

Display processor 43 is a display device, for example, such as a liquid crystal display, and outputs and displays the service that is selected in service selector 42. Display processor 43 is not limited to the liquid crystal display, and may be any other display device, such as a plasma display, that can output and display the service which is selected in service selector 42.

Status management unit 34 manages a status of signage terminal 5. FIG. 5 is a diagram illustrating an example of the status of signage terminal 5. As illustrated in FIG. 5, statuses of signage terminal 5 include a status (live or signage) of the signage service that is selected in signage service selector 41, and a status (a signage service or other services) of a service that is selected in service selector 42, and an ON/OFF status (display-ON or display-OFF) of display processor 43. Furthermore, status management unit 34 adds a terminal ID of signage terminal 5 to each status (hereinafter referred to as a terminal status) described above, and thus creates status notification data. The status notification data that is created in status management unit 34 is periodically transmitted to terminal status and storing-up situation management unit 25 of signage server 3 via transmitter 36. The creating of the status notification data may be performed in transmitter 36 instead of status management unit 34.

Figure 6:
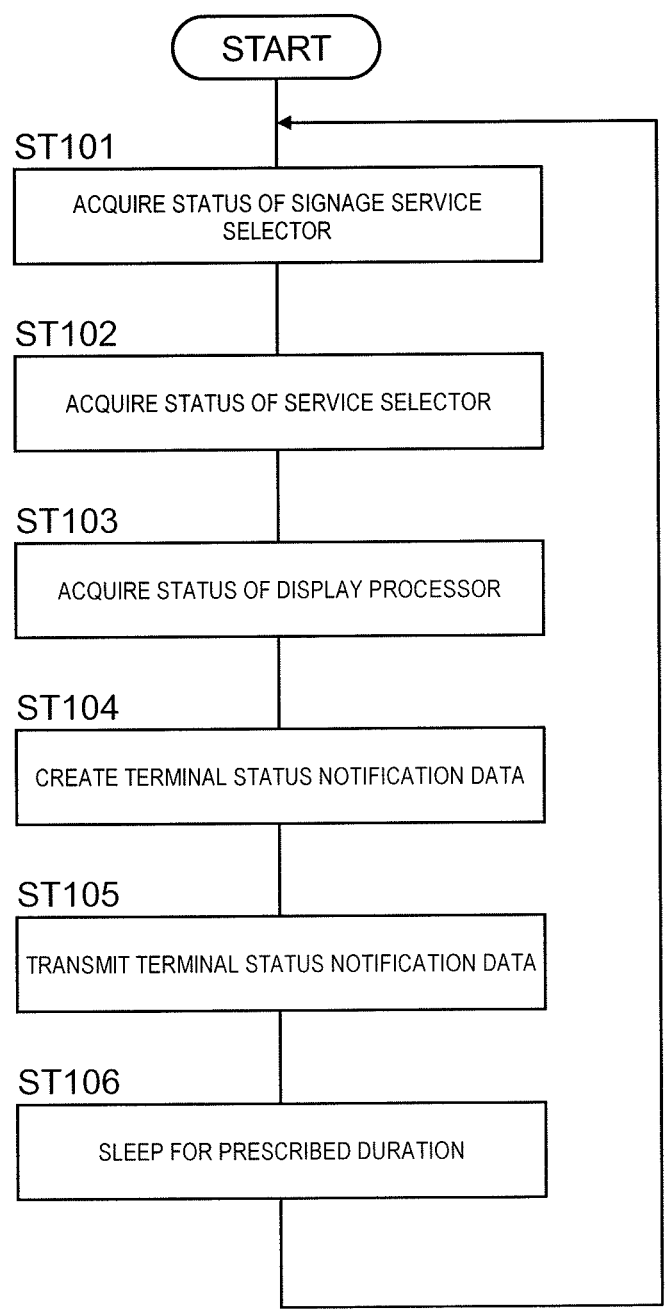
FIG. 6 is a flowchart for describing creating processing and transmitting processing for status notification data.

FIG. 6 is a flowchart for describing creating processing and transmitting processing for the status notification data in status management unit 34 and transmitter 36, respectively. With reference to FIG. 6, first, status management unit 34 acquires the status (Step ST101) of signage service selector 41, the status (Step ST102) of service selector 42, and the status (Step ST103) of display processor 43 from the signage service selector 41, service selector 42, and display processor 43, respectively. Subsequently, the status notification data is created by adding the terminal ID of signage terminal 5 to the terminal statuses that are acquired in Steps ST101 to ST103 (Step ST104).

Figure 7:
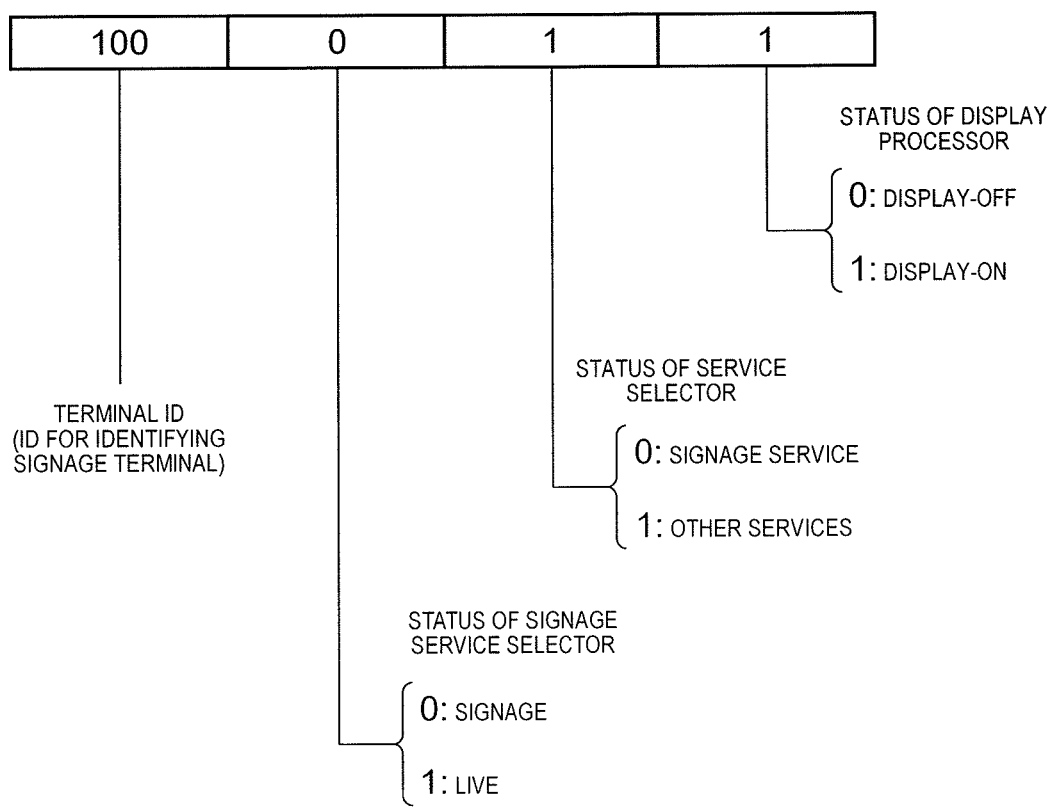
FIG. 7 is a diagram illustrating an example of the status notification data.

FIG. 7 is a diagram illustrating an example of the status notification data. As illustrated in FIG. 7, the status notification data includes the terminal ID, the status of the signage service selector, and the status of the display processor. The terminal ID is an ID for identifying signage terminal 5, and is "100" in an example in FIG. 7. The status of the signage service selector is set to "0" in a case where the status of the signage service that is selected in signage service selector 41 is "signage" and is set to "1" in a case where the status of the signage service is "live." In the example in FIG. 7, the status of the signage service selector is "0." The status of the service selector is set to "0" in a case where the status of the service that is selected in service selector 42 is "signage service" and is set to "1" in a case where the status of the service is "other services." In the example in FIG. 7, the status of the service selector is "1." The status of the display processor is set to "0" in a case where the ON/OFF status of display processor 43 is "display-OFF" and is set to "1" in a case where the ON/OFF status of display processor 43 is "display-ON." In the example in FIG. 7, the status of the display processor is "1."

In Step ST105 that follows Step ST104, the status notification data that is created in status management unit 34 is transmitted to terminal status and storing-up situation management unit 25 of signage server 3 via transmitter 36. In next Step ST106, a sleep status for a prescribed duration that is determined in advance is attained. After Step ST106, returning to Step ST101 takes place, and Steps ST101 to ST105, which are described above, are repeated. In this manner, the status notification data (refer to FIG. 7) that is information indicating the status of signage terminal 5 is periodically transmitted from signage terminal 5 to signage server 3. Accordingly, it is possible that signage server 3 knows the status (the terminal status) of signage terminal 5.

Figure 8:
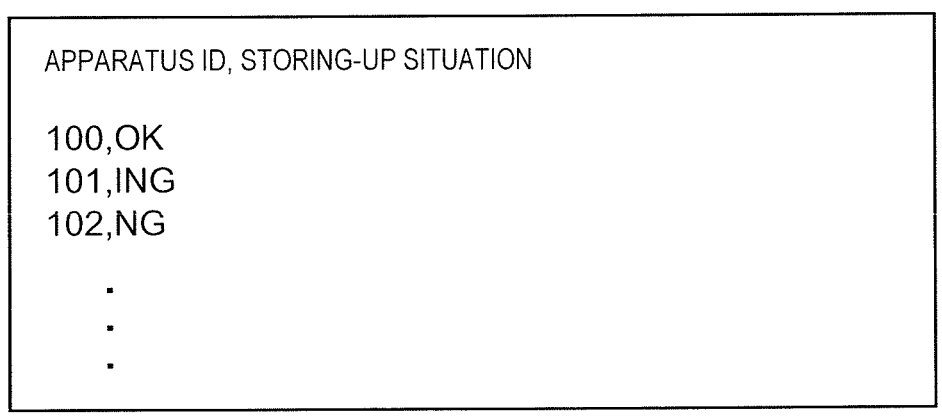
FIG. 8 is a diagram illustrating an example of storing-up situation notification data.

Storing-up status management unit 35 determines and manages a storing-up situation (that is, a download situation of the signage content) of the signage content in content storing-up unit 32. In a case where the storing-up of the signage content in content storing-up unit 32 is in progress, a result of the determination is "ING." In a case where the storing-up of the signage content is completed, the result of the determination is "OK." In a case where the storing-up of the signage content fails, the result of the determination is "NG." In the present embodiment, in a case where the storing-up is not completed within a prescribed time after the signage content starts to be stored up, it is determined that the storing-up fails. Storing-up status management unit 35 creates storing-up situation notification data by adding the terminal ID of signage terminal 5 to the result of the determination described above. The storing-up situation notification data that is created in storing-up situation management unit 35 is transmitted to terminal status and storing-up situation management unit 25 of signage server 3 via transmitter 36. FIG. 8 is a diagram illustrating an example of the storing-up situation notification data. As illustrated in FIG. 8, the storing-up situation notification data includes the terminal ID (for example, "100") of signage terminal 5, and the storing-up situation (for example, "OK"). The creating of the storing-up situation notification data may be set to be performed in transmitter 36 instead of storing-up situation management unit 35.

Figure 9:
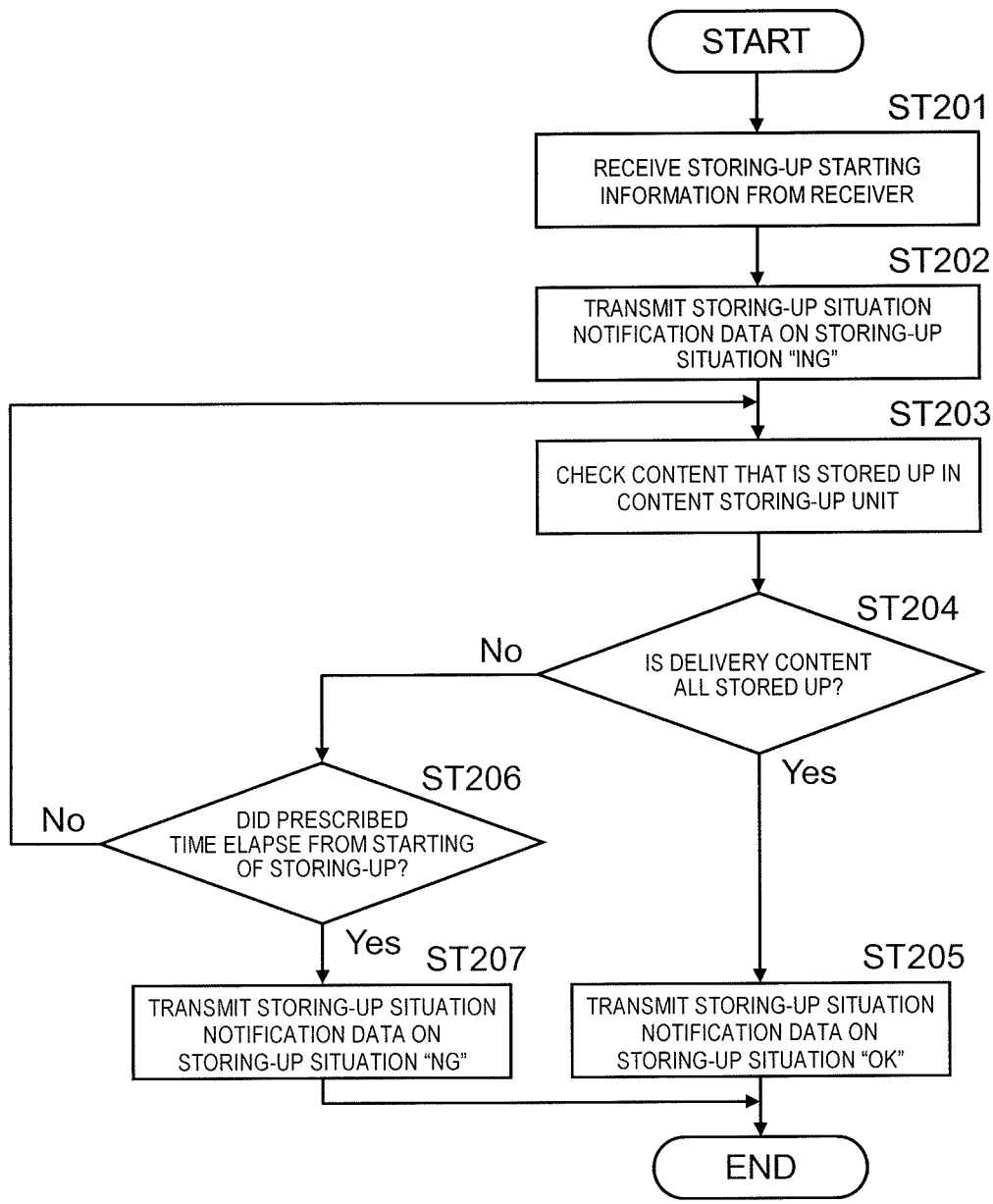
FIG. 9 is a flowchart for describing creating processing and transmitting processing for the storing-up situation notification data.

FIG. 9 is a flowchart for describing creating processing and transmitting processing for the storing-up situation notification data in storing-up situation management unit 35 and transmitter 36, respectively. With reference to FIG. 9, storing-up situation management unit 35 receives storing-up starting information indicating that the signage content starts to be stored up in content storing-up unit 32, from receiver 31 (Step ST201). Subsequently, the storing-up situation notification data is created with the storing-up situation as "ING" and is transmitted to signage server 3 via transmitter 36 (ST202). Next, the content that is stored up in content storing-up unit 32 is checked (Step ST203). In next Step ST204, it is determined whether or not items of content that are delivered from signage server 3 are all stored in content storing-up unit 32. In a case where it is determined that the items of content are all stored up (Yes in ST204), proceeding to Step ST205 takes place. In a case where it is determined that items of content are not all stored up (No in ST204), proceeding to Step ST206 takes place.

In Step ST205, the storing-up situation notification data is created with the storing-up situation as "OK" and is transmitted to signage server 3 via transmitter 36. In Step ST206, it is determined whether or not a prescribed time elapsed from starting of the storing-up. In a case where it is determined that a prescribed time elapsed (Yes in ST206), proceeding to Step ST207 takes place. In a case where it is determined that the prescribed time did not elapse (No in ST206), returning to Step ST203 takes place. In Step ST207, the storing-up situation notification data is created with the storing-up situation as "NG" and is transmitted to signage server 3 via transmitter 36. In this manner, the storing-up situation notification data (refer to FIG. 8) that is information indicating the storing-up situation of the signage content in content storing-up unit 32 can be transmitted from signage terminal 5 to signage server 3. Accordingly, it is possible that signage server 3 knows the storing-up situation (that is, the download situation of the signage content) of the signage content in storing-up situation management unit 35 of signage terminal 5.

Signage server 3 includes receiver 21 that receives the data file (refer to FIG. 4) of the signage content that is transmitted from content input apparatus 2, content database (DB) 22 in which the data file that is received by receiver 21 is stored, schedule management unit 23 that stores and manages the delivery schedule information (that is, a delivery instruction) which is included in the data file that is received by receiver 21, delivery controller 24 that download-delivers the data file that is stored in content database (DB) 22, to signage terminal 5 based on the delivery schedule information that is stored in schedule management unit 23, terminal status and storing-up situation management unit 25 that receivers and stores the status notification data and the storing-up situation notification data on signage terminal 5, from signage terminal 5, and terminal database (DB) 26 in which pieces of information on all signage terminals 5 that are delivery targets of signage server 3 is stored.

FIGS. 10A and 10B are diagrams, each illustrating an example of the signage content that is stored in content database (DB) 22. FIG. 10A illustrates an example of content information on the signage content. FIG. 10B illustrates an example of the playlist information and the schedule information that are the reproduction schedule for the signage content.

As illustrated in FIG. 10A, signage content information includes a content ID and a content object (the content data). The content ID is an identifier for uniquely identifying the content information. The content object is data such as a moving image, a still image, or audio. In the present embodiment, the content object is the moving image.

As illustrated in FIG. 10B, the playlist information includes a playlist ID and a content list. A playlist ID is an identifier for uniquely identifying the playlist information. The content list is a list indicating the order of reproduction of the content data. Content IDs are arranged in the order of reproduction in the content list. The schedule information includes a schedule ID, a starting time, an ending time, a playlist ID, and a terminal ID. The schedule ID is an identifier for uniquely identifying the schedule information. The starting time and the ending time are the reproduction schedule for the content data. The starting time and the ending time define a reproduction starting time for the content data and a reproduction ending time for the content data, respectively. The playlist ID is a playlist ID of the playlist information that is associated with the schedule information. The terminal ID is a terminal ID of signage terminal 5 that is associated with the schedule information.

For management, terminal status and storing-up situation management unit 25 registers status notification data that is received from signage terminal 5, in a signage terminal management table, or updates the status notification data. Furthermore, in a case where the status notification data is not received from signage terminal 5 during a prescribed duration, terminal status and storing-up situation management unit 25 determines that signage terminal 5 does not operate normally and determines an operativeness/non-operativeness status of signage terminal 5 as "NG." Signage terminal 5 that is a determination target can be determined based on pieces of information on all signage terminals 5, which are stored in advance in terminal database (DB) 26.

Figure 11:
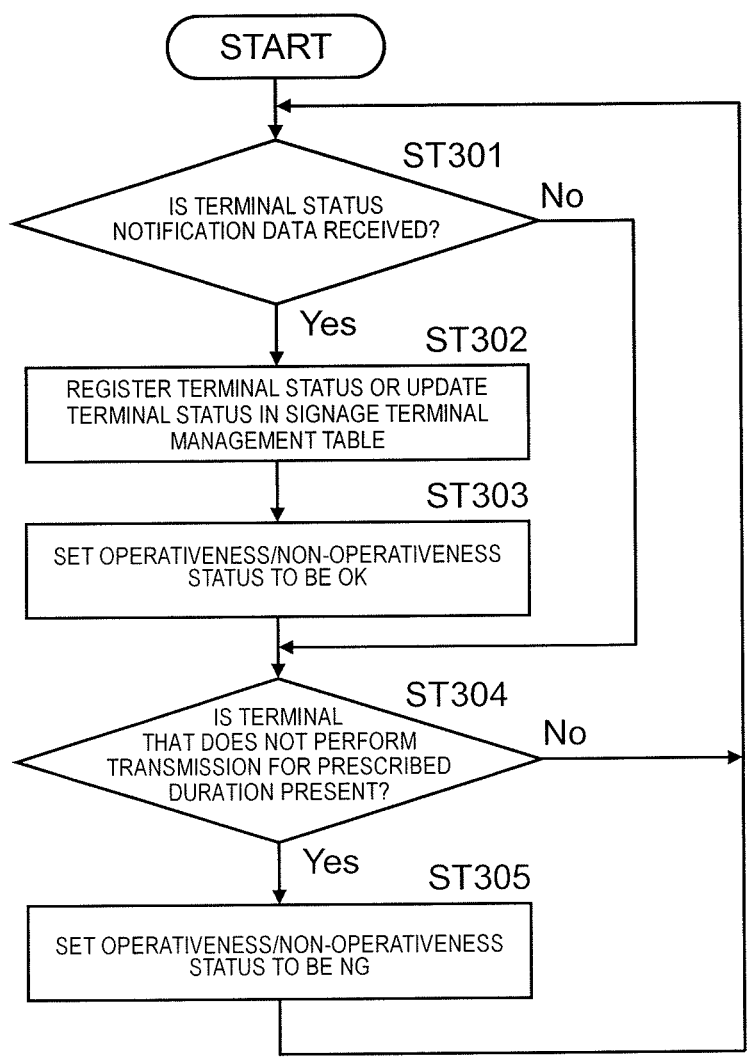
FIG. 11 is a flowchart for describing processing that determines an operativeness/non-operativeness status of the signage terminal.

FIG. 11 is a flowchart for describing processing that determines the operativeness/non-operativeness status of signage terminal 5 in terminal status and storing-up situation management unit 25. With reference to FIG. 11, first, it is determined whether or not the status notification data is received from signage terminal 5 that is the determination target (Step ST301). In a case where it is determined that the status notification data is received (Yes in ST301), proceeding to Step ST302 takes place. In a case where it is determined that the status notification data is not received (No in ST301), proceeding to Step ST304 takes place. In ST302, the terminal status of signage terminal 5 is registered in the signage terminal management table or is updated, with the terminal ID (refer to FIG. 7), which is included in the status notification data, as a key. In following ST303, the operativeness/non-operativeness status of signage terminal 5 is set to be "OK."

In Step ST304, based on a reception history of terminal status and storing-up situation management unit 25, it is determined whether or not signage terminal 5 that does not transmit the status notification data during a prescribed duration is present. In a case where it is determined that signage terminal 5 which does not transmit the status notification data for the prescribed duration is present (Yes in ST304), proceeding to Step ST305 takes place. In a case where it is determined that such signage terminal 5 is not present (No in ST304), returning to Step ST301 takes place. In Step ST305, the operativeness/non-operativeness status of signage terminal 5 that does not transmit the status notification data during the prescribed duration is set to be "NG." In this manner, based on whether or not the status notification data is received during the prescribed duration, the operativeness/non-operativeness status of signage terminal 5 can be determined.

FIG. 12 is a diagram illustrating an example of the signage terminal management table. As illustrated in FIG. 12, the signage terminal management table includes the terminal ID (for example, "100"), the operativeness/non-operativeness status (for example, "OK"), the status (for example, "0") of the signage service selector, the status (for example, "1") of the service selector, and the status (for example, "1") of the display processor. The terminal statuses (the status of the signage service selector, the status of the service selector, and the status of the display processor) and the operativeness/non-operativeness status, which are described above, are registered or are updated based on the status notification data that is received from signage terminal 5 and on operativeness/non-operativeness determination in terminal status and storing-up situation management unit 25.

Delivery controller 24 retains in advance the delivery priority policy that defines the priority of delivery to signage terminal 5 (hereinafter referred to as "delivery priority"), which is used when the signage content is download-delivered from signage server 3 to signage terminal 5. FIG. 13 is a diagram illustrating an example of the delivery priority policy. The delivery priority is defined in a manner that corresponds to the statuses (the terminal status and the operativeness/non-operativeness status) of signage terminal 5. The delivery priority is expressed in number. The smaller a number, the greater the priority (the priority order). Regarding the "status of the signage service selector," "signage" is defined as having a higher priority than "live." Regarding the "status of the service selector," "signage service" is defined as having a higher priority than "other services." Regarding the "status of the display processor," "display-ON" is defined as having a higher priority than "display-OFF."

In a case where, regarding all terminal statuses, the "status of the signage service selector" is set to be at the highest level and where the "status of the signage service selector" is "signage," the "status of the service selector" is set to be at a higher level than the "status of the display processor" and thus the priority is defined. In a case where the status of the signage service selector" is "live," the "status of the display processor" is set to be at a higher level than the "status of the service selector," and thus the priority is defined. Therefore, in a case where the "status of the signage service selector" is "signage," where the "status of the service selector" is "signage service," and where the "status of the display processor" is "display-ON," the priority is highest ("priority="1"). Furthermore, in a case where the "status of the signage service selector" is "live," where the "status of the service selector" is "other services," and where the "status of the display processor" is "display-OFF," the priority is lowest ("priority="8").

The delivery priority policy in FIG. 13 is an example, and a suitable change is possible. For example, in a case where the "status of the signage service selector" is "live," the priorities may be all set to be the same, regardless of the "status of the service selector" and the "status of the display processor." Furthermore, in a case where the "status of the service selector" is "other services," the priorities may be all set to be the same, regardless of the "status of the signage service selector" and the "status of the display processor." Furthermore, in a case where the "status of the display processor" is "display-OFF," the priorities may be all set to be the same, regardless of the "status of the signage service selector," and the "status of the service selector."

When the signage content is delivered from signage server 3 to signage terminal 5, delivery controller 24 determines the order of delivery according to the status of signage terminal 5 for every signage terminal 5 that is the delivery target based on the delivery priority policy described above. Specifically, first, it is determined whether the delivery to every signage terminal 5 that is the delivery target is immediately performed or is postponed. Thereafter, the order of delivery to the signage terminal 5, the delivery to which is postponed, is determined.

Figure 14:
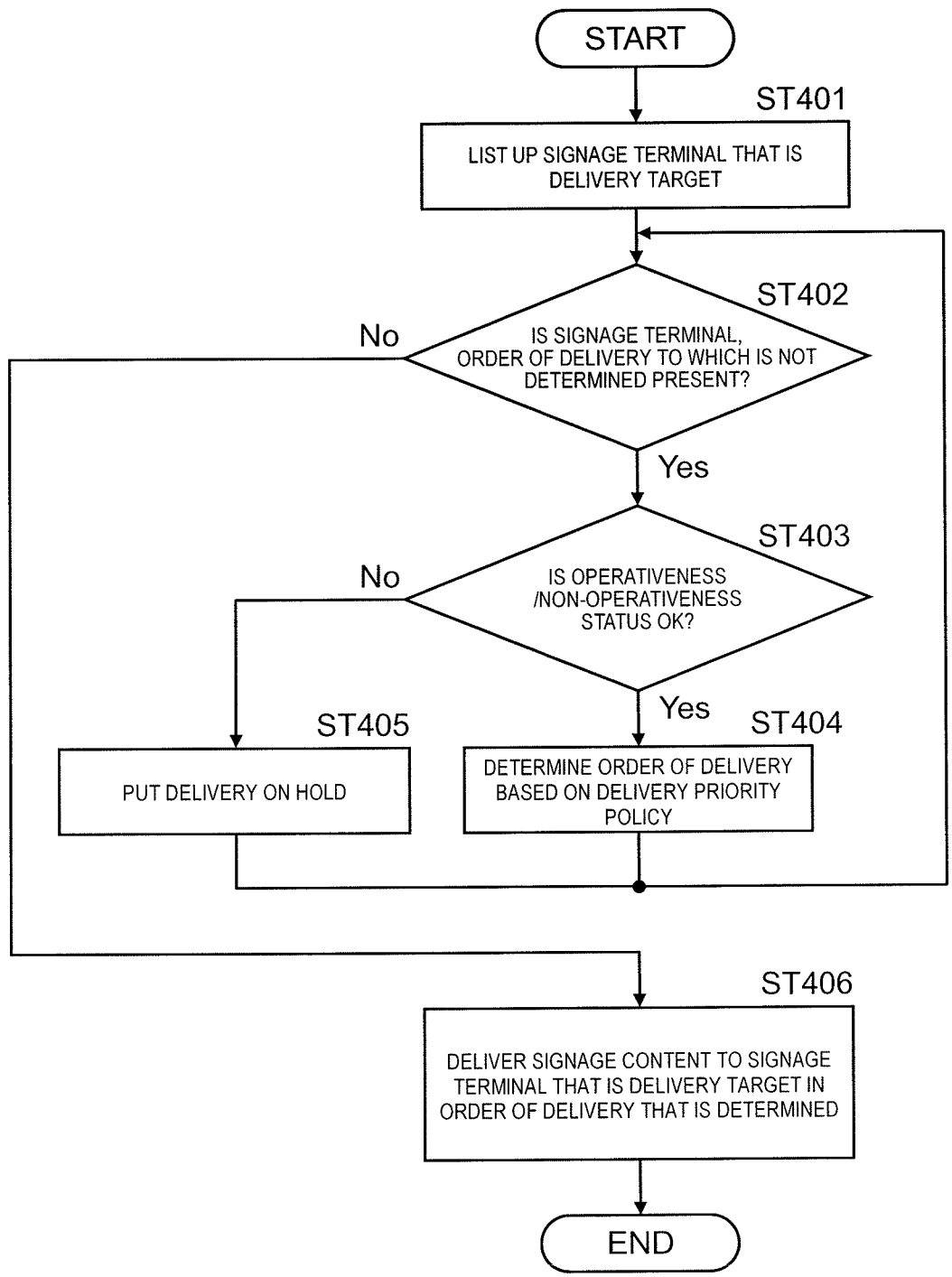
FIG. 14 is a flowchart for describing delivery control processing in a delivery controller.

FIG. 14 is a flowchart for describing delivery control processing in delivery controller 24. With reference to FIG. 14, first, signage terminal 5 that is the delivery target is listed up (ST401). Subsequently, it is determined whether or not signage terminal 5, the order of delivery to which is not determined, is present (ST402). In a case where it is determined that signage terminal 5, the order of delivery to which is not determined, is present (Yes in Step ST402), proceeding to Step ST403 takes place. In a case where it is determined that signage terminal 5, the order of delivery to which is not determined, is not present (No in Step ST402), proceeding to Step ST406 takes place.

In Step ST403 that follows Step ST402, it is determined whether or not the operativeness/non-operativeness status of signage terminal 5 is OK. In a case where it is determined that the operativeness/non-operativeness status is OK (Yes in Step ST403), proceeding to Step ST404 takes place. In a case where a result of the determination is not OK (No in Step ST403), proceeding to Step ST405 takes place. In Step ST404, the order of delivery is determined based on the status (the terminal status) of signage terminal 5 and the delivery priority policy, and then returning to Step ST402 takes place. In Step ST405, the delivery to signage terminal 5 is put on hold (postponed), and then returning to Step ST402 takes place.

In Step ST406 that follows Step ST402, the signage content is delivered to signage terminal 5 that is the delivery target according the order of delivery that is determined in Step ST404 described above.

In this manner, when delivering the signage content to signage terminal 5 that is the delivery target, first, delivery controller 24 can select signage terminal 5 of which the operativeness/non-operativeness status is OK (that is, excludes signage terminal 5 of which the operativeness/non-operativeness status is NG), can determine the order of delivery to signage terminal 5 of which the operativeness/non-operativeness status is OK, based on the status (the terminal status) of signage terminal 5 and the delivery priority policy, and can perform the delivery according to the order of delivery that is determined.

With signage system 1 according to the first embodiment of the present disclosure, which is configured as described above, the order of delivery is determined according to a situation of the signage terminal 5. Thus, the delivery to signage terminal 5 (for example, signage terminal 5 in which the signage is not selected as the signage service, signage terminal 5, the display status of whose display processor 43 is OFF, signage terminal 5 of which the operativeness/non-operativeness status is NG, or the like) that does not need to immediately perform content update can be postponed, and the delivery to signage terminal 5 (for example, signage terminal 5 in which the signage is selected as the signage service) that needs to immediately perform the content update can be preferentially performed. As a result, the content update time for signage terminal 5 that needs to immediately perform the content update can be shortened. Accordingly, it is possible that simultaneous download delivery of the signage content to many signage terminals 5 is efficiently performed.

Second Embodiment

Next, signage system 1 according to a second embodiment of the present disclosure will be described with reference to FIG. 15. Signage system 1 according to the second embodiment is different from the first embodiment in that the status of signage terminal 5 for defining the delivery priority is a combination of the installation place of signage terminal 5 and the time, but not the terminal status or the operativeness/non-operativeness status of signage terminal 5. In the second embodiment, it is assumed that matters which will be not particularly described below is the same as those in the first embodiment.

Figure 15:
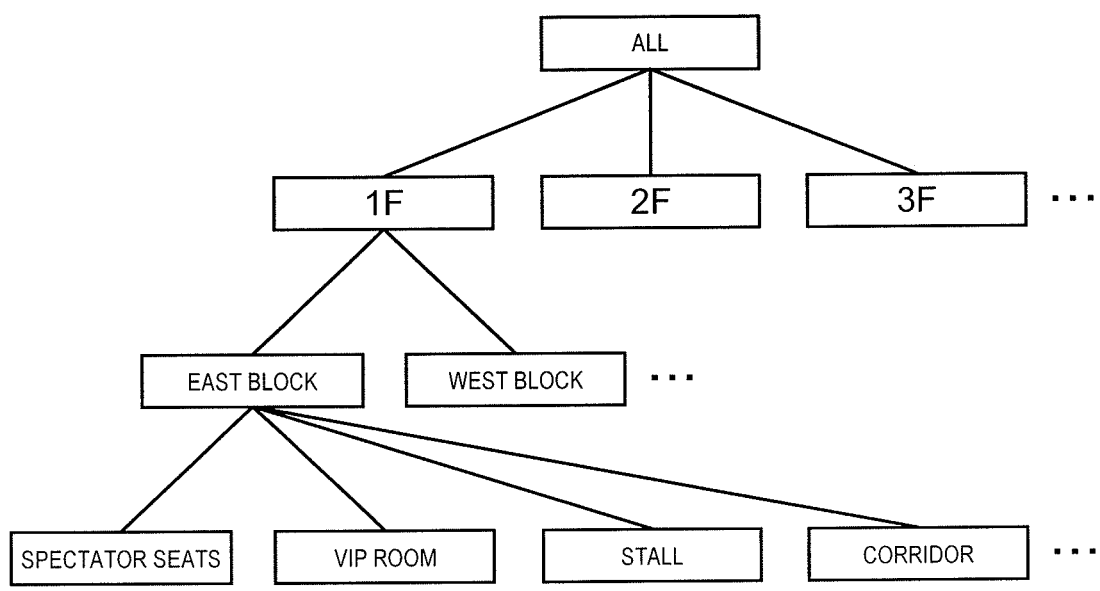
FIG. 15 is a diagram illustrating that a soccer stadium building is hierarchically segmented into partial places.

FIG. 15 is a diagram illustrating that the soccer stadium building is hierarchically segmented into partial places. As illustrated in FIG. 15, the soccer stadium building can be hieratically segmented into floors ("first floor," "second floor," and "third floor," and so forth). Each floor can be segmented into blocks ("east block," "west block," and so forth). Each block can be segmented into seats and facilities ("seats." "VIP room," "stall," corridor," and so forth). Regarding places that result from the segmenting as described above, signage terminals 5 that are installed in the places are grouped, and thus it is possible that the delivery priority policy which defines the delivery priority in accordance with the partial places that result from the segmenting of the soccer stadium building, and the time (time spans) is created.

For example, it is possible that the delivery priority policy which defines the delivery priority is created in such a manner that the delivery to signage terminals 5 which are installed in spectator seats where spectator number is large and the VIP room in use is preferentially performed. For example, it is also possible that the delivery priority policy which defines the delivery priority is created in such a manner that the download delivery to signage terminals 5 which are installed in the spectator seats is preferentially performed during the game and in such a manner that the delivery to signage terminal 5 which is installed in the stall, the corridor, or the like is preferentially performed during the timeout.

Furthermore, in a case where signage system 1 according to the present disclosure finds application in a hotel and signage terminal 5 is installed in a restaurant and a lobby, for example, it is also possible that the delivery priority policy which defines the delivery priority is created in such a manner that the download delivery to signage terminal 5 that is installed in the restaurant is preferentially performed for a time span, such as a mealtime span, for which many people go to the restaurant, and in such a manner that the download delivery to signage terminal 5 that is installed in a reception desk or the lobby is preferentially performed for time spans, such as a morning time span and an evening time span, for which many people check in or check out.

In this manner, the combination of the installation place of signage terminal 5 and the time is used as the status of signage terminal 5, and thus the delivery timing can be determined according to the combination of the installation place of signage terminal 5 and the time. Accordingly, it is possible that a better-quality service is provided according to the installation place of signage terminal 5 and the time (the time span). The status of signage terminal 5 may be only the installation place of signage terminal 5, instead of the combination of the installation place of signage terminal 5 and the time. In this case, it is also possible that a better-quality service is provided according to the installation place of signage terminal 5.

Third Embodiment

Next, signage system 1 according to a third embodiment of the present disclosure will be described with reference to FIGS. 16 to 18. Signage system 1 according to the third embodiment is different from those according to the first embodiment and the second embodiment in that the status of signage terminal 5 for defining the delivery priority is the reproduction schedule for the signage content in signage terminal 5. In the third embodiment, it is assumed that matters which will be not particularly described below is the same as those in the first embodiment and the second embodiment, which are described above.

Figure 16:
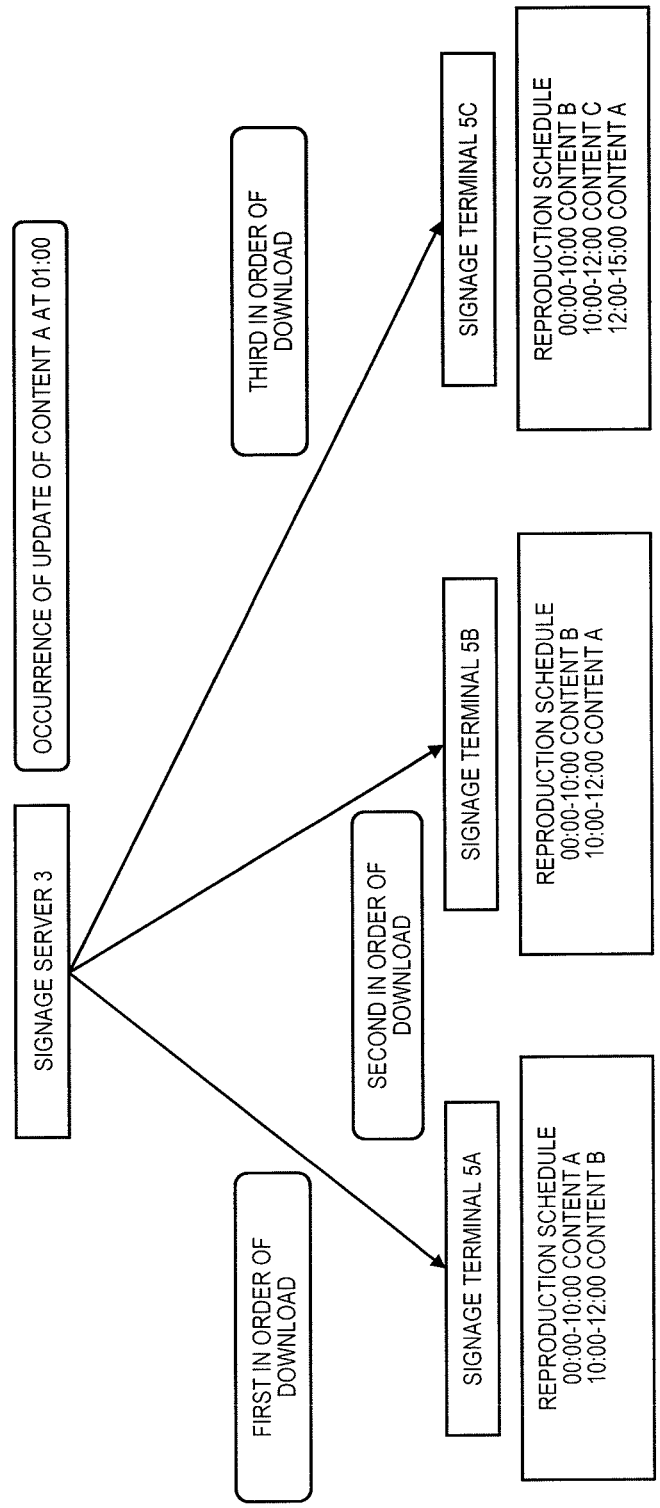
FIG. 16 is a diagram for describing a delivery priority in accordance with a reproduction schedule for the signage content.

FIG. 16 is a diagram for describing the delivery priority in accordance with the reproduction schedule for the signage content. In FIG. 16, a case is assumed where content A that is stored up in content database (DB) 22 (refer to FIG. 2) of signage server 3 is updated at the time "01:00," and where content A that is updated is download-delivered to signage terminals 5A, 5B, and 5C. As illustrated in FIG. 16, signage terminals 5A to 5C retain the reproduction schedule that defines a reproduction time span (a reproduction staring time and a reproduction ending time) for each of the pieces A to C of content. The reproduction schedule for each of the pieces A to C of content varies from one signage terminal 5 to another. The reproduction schedules for the content A in signage terminal 5A, signage terminal 5B, and signage terminal 5C are "00"00 to 10:00," "10:00 to 12:00," and "12:00 to 15:00," respectively. In the present embodiment, it is assumed that the reproduction schedule for the content is the reproduction time span for which the content is reproduced repeatedly at a prescribed timing.

Signage server 3 acquires the reproduction schedule for the content A that, as a result of communication with each of signage terminals 5A to 5C, is retained in each of signage terminals 5A to 5C, and preferentially performs the download delivery to signage terminal 5, the reproduction schedule (the reproduction time span) for which includes a current time. In a case where the current time is not included in the reproduction time span, the download delivery to signage terminals 5 is performed starting from signage terminal 5 in the order, the reproduction time span for which is close to the current time.

In an example in FIG. 16, because the current time (01:00) is included in the reproduction time span (00:00 to 10:00) for signage terminal 5A, first, the download delivery to signage terminal 5A is preferentially performed (the first in the order of download). The download delivery to signage terminal 5B and signage terminal 5C, the reproduction time spans for which do not include the current time, is performed in the order in which the reproduction time spans are close to the current time. Because the reproduction time span (10:00 to 12:00) for signage terminal 5B is closer to the current time (01:00) than the reproduction time span (12:00 to 15:00) for the signage terminal 5C, the download delivery to signage terminal 5B is earlier performed (the second in the order of download), and then the download delivery to signage terminal 5C is performed (the third in the order of download). In this manner, the order of delivery can be determined according to the reproduction schedule (the reproduction time span) for the content.

Figure 17:
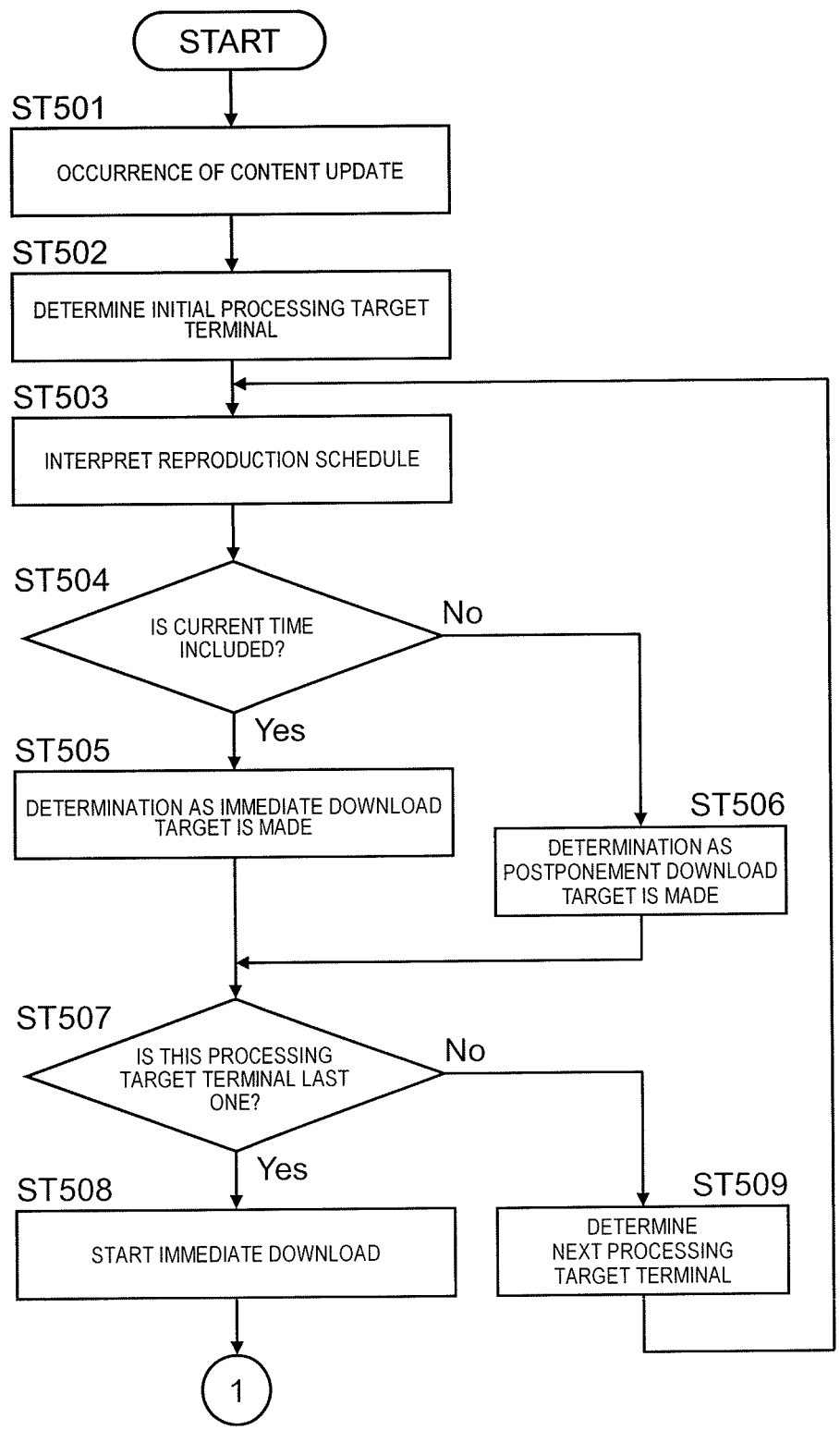
FIG. 17 is a flowchart for describing the delivery control processing in accordance with the reproduction schedule for the signage content.
Figure 18:
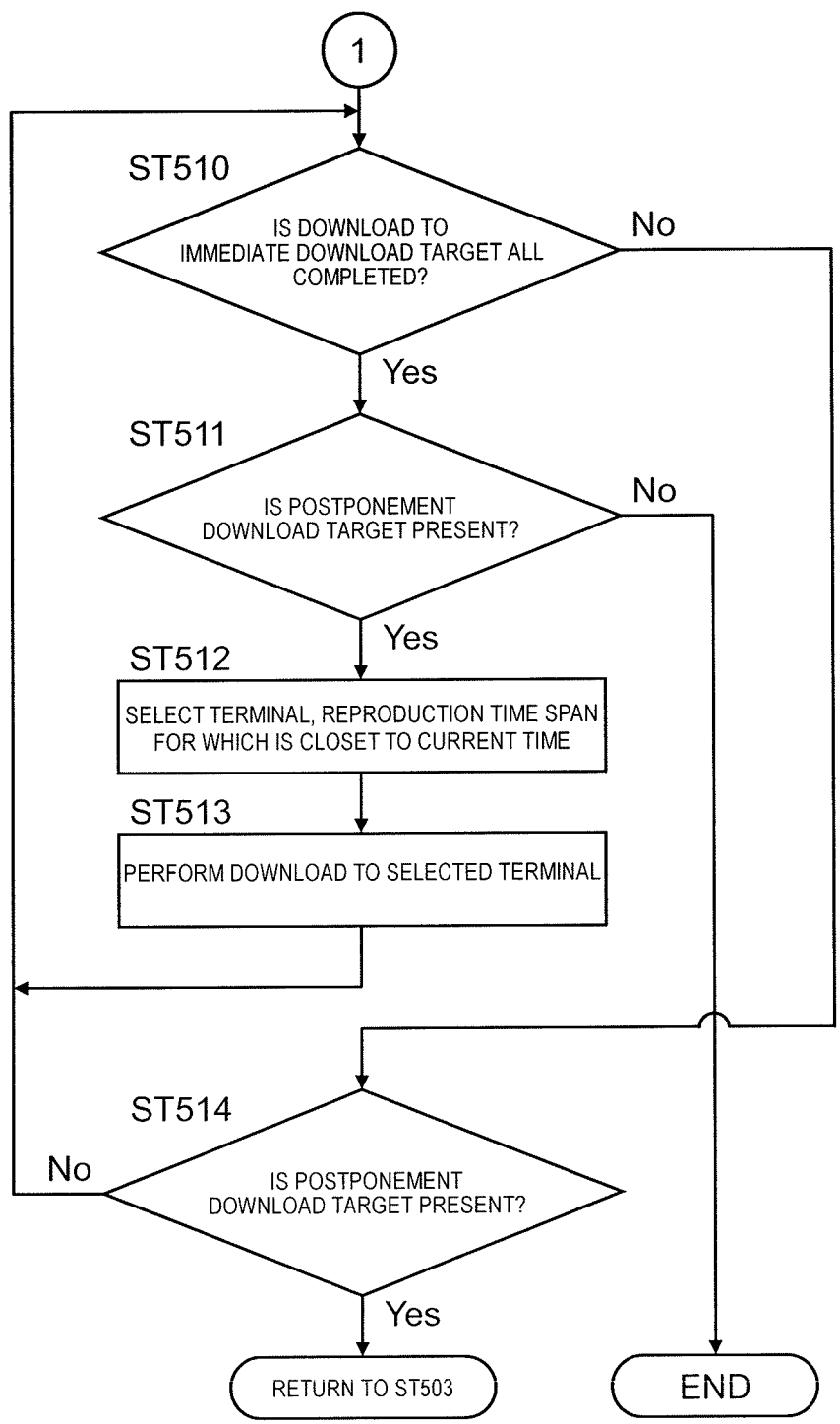
FIG. 18 is a flowchart for describing the delivery control processing in accordance with the reproduction schedule for the signage content.

FIGS. 17 and 18 are flowcharts for describing the delivery control processing in accordance with the reproduction schedule for the signage content. In FIGS. 17 and 18, a case is assumed where update of certain content occurs and where the certain content is download-delivered from signage server 3 to a plurality of signage terminals 5.

With reference to FIG. 17, first, when the update of the content occurs (Step ST501), not only is signage terminal 5, which is the target to which the content is delivered, listed up, but signage terminal 5 that is an initial processing target is also specified with any method (Step ST502). Subsequently, the reproduction schedule for the content in signage terminal 5 is acquired and interpreted (Step ST503).

In next Step ST504, it is determined whether or not the current time is included in the reproduction schedule (the reproduction time span). In a case where it is determined that the current time is included (Yes in Step ST504), proceeding to Step ST505 takes place. In a case where it is determined that the current time is not included (No in Step ST504), proceeding to Step ST506 takes place. In Step ST505, signage terminal 5 is determined as a target (hereinafter referred to as an "immediate download target") to which the download delivery is immediately performed, and then, proceeding to Step ST507 takes place. In Step ST506, signage terminal 5 is determined as a target (hereinafter referred to a "postponement download target"), the download delivery to which is postponed, and then, proceeding to Step ST507 takes place.

In Step ST507, it is determined whether or not signage terminal 5 is the last processing target among signage terminals 5 that are the listed-up delivery targets. In a case where it is determined that signage terminal 5 is the last processing target (Yes in Step ST507), proceeding to Step ST508 takes place. In a case where it is determined that signage terminal 5 is not the last processing target (No in Step ST507), proceeding to Step ST509 takes place. In Step ST508, the immediate download to signage terminal 5 starts, and then proceeding to Step ST510 (refer to FIG. 18) takes place. In Step ST509, next, signage terminal 5 that is the processing target is selected with any method, and then returning to Step ST503 takes place.

With reference to FIG. 18, in Step ST510, it is determined whether or not the download delivery to all signage terminals 5 that are immediate download targets is completed. Whether or not the download delivery is completed can be determined based on information on the storing-up situation of content storing-up unit 32, which is stored in terminal status and storing-up situation management unit 25. In a case where it is determined that the download delivery is completed (Yes in Step ST510), proceeding to Step ST511 takes place. In a case where it is determined that the download delivery is not completed (No in Step ST510), proceeding to Step ST514 takes place.

In Step ST511, it is determined whether or not the postponement download target is present. In a case where it is determined that the postponement download target is present (Yes in Step ST511), proceeding to Step ST512 takes place. In a case where it is determined that the postponement download target is not present (No in Step ST511), the processing is ended.

In Step ST512, signage terminal 5, the reproduction schedule (the reproduction time span) for which is retained in signage terminal 5 itself and is closest to the current time, is selected from among signage terminals 5 that are determined as the postponement download targets. In following ST513, the download delivery to signage terminal 5 that is selected in Step ST512 is performed, and then returning Step ST510 takes place.

In Step ST514, it is determined whether or not the postponement download target is present. In the case where it is determined that the postponement download target is present (Yes in Step ST514), returning to Step ST503 (refer to FIG. 17) takes place. In the case where it is determined that the postponement download target is not present (No in Step ST514), returning to Step ST510 takes place. Accordingly, in a case where the time elapsed while the processing in progress and thus the current time is included in the reproduction time span for the postponement download target, it is possible that the postponement download target is additionally included in immediate download targets.

As described above, the reproduction schedule for the signage content in signage terminal 5 is used as the status of signage terminal 5, and thus the order of delivery can be determined according to the reproduction schedule for the signage content. Accordingly, it is possible that the download delivery to signage terminal 5 that needs to immediately perform the content update is preferentially performed. Furthermore, it is also possible that signage terminal 5, the reproduction schedule (the reproduction time span) for which includes the current time entirely, is set to be the postponement download target, and that the download delivery to signage terminals 5 is performed starting from signage terminal 5 in the order, the reproduction schedule for which is close to the time when the content update is performed. In this case, it is desirable that the download delivery is performed considering the processing time required for the content update.

The present disclosure is provided above based on the specific embodiments, but the embodiments are only examples, and the present disclosure is not limited by the embodiments. Furthermore, all the constituent elements of each of the signage server, the signage system, and the content delivery method, which are described above, are not necessarily essential, and it is possible to make a suitable selection from among the all constituent elements at least within a range that does not depart from the scope of the present disclosure.

INDUSTRIAL APPLICABILITY

The signage server, the signage system, and the content delivery method according to the present disclosure are useful as a signage server, a signage system, and a content delivery method, respectively, in all of which the simultaneous download delivery of signage content to many signage terminals is possibly performed efficiently.

REFERENCE MARKS IN THE DRAWINGS

1 SIGNAGE SYSTEM
2 CONTENT INPUT DEVICE
3 SIGNAGE SERVER
4 LIVE SERVER
5 SIGNAGE TERMINAL
21 RECEIVER
22 CONTENT DATABASE (DB)
23 SCHEDULE MANAGEMENT UNIT
24 DELIVERY CONTROLLER
25 TERMINAL STATUS AND STORING-UP SITUATION MANAGEMENT UNIT
26 TERMINAL DATABASE (DB)
31 RECEIVER
32 CONTENT STORING-UP UNIT
33 CONTENT DISPLAY UNIT
34 STATUS MANAGEMENT UNIT
35 STORING-UP SITUATION MANAGEMENT UNIT
36 TRANSMITTER
41 SIGNAGE SERVICE SELECTOR
42 SERVICE SELECTOR
43 DISPLAY PROCESSOR

The invention claimed is:
1. A signage server that download-delivers signage content to a signage terminal, the signage server comprising:
   a content database in which the signage content associated with the signage terminal that is a delivery target is stored;
   a terminal database that stores terminal information of the signage terminal;
   a terminal status manager that acquires status information data that includes a terminal ID and indicates a signage service type, including a first mode and a second mode being different from the first mode, from the signage terminal that is the delivery target, and stores the acquired status information data in the terminal database, wherein the first mode is a download mode in which the signage terminal downloads delivered signage content; and
   a delivery controller that
      receives an instruction to deliver the signage content to the signage terminal that is the delivery target,
      determines whether or not to deliver the signage content immediately based on a delivery priority policy for every signage terminal that downloads the signage content, wherein the delivery priority policy that defines a priority of delivery to the signage terminal in accordance with the status of the signage terminal is retained in advance,
      performs immediately the delivery to the signage terminal, which is the first mode, and determines to postpone the delivery to the signage terminal, which is the second mode.

2. The signage server of claim 1,
wherein the delivery controller determines the order of delivery based on the status information and the delivery priority policy, for the signage terminal, the delivery to which is postponed.

3. The signage server of claim 1,
wherein the status of the signage terminal is determined based on at least one among a type of content that is displayed in the signage terminal, turning on or off displaying in the signage terminal, operativeness/non-operativeness of the signage terminal, a reproduction schedule for the signage content in the signage terminal, an installation place of the signage terminal, and a combination of the installation place of the signage terminal and time.

4. A signage system comprising:
the signage server of claim 1; and
a signage terminal to which the signage content is download-delivered from the signage server.

5. The signage system of claim 4,
wherein the signage terminal is configured with a set-top box that performs data communication with the signage server, and a display device on which content that is output from the set-top box is displayed.

6. A content delivery method that download-delivers signage content from a signage server to a signage terminal, the method comprising:
storing the signage content associated with the signage terminal that is a delivery target in a content database;
storing terminal information of the signage terminal in a terminal database;
acquiring, by a terminal status manager, status information data that includes a terminal ID and indicates a signage service type, including a first mode and a second mode being different from the first mode, from the signage terminal that is the delivery target, and storing, by the terminal status manager, the acquired status information data in the terminal database, wherein the first mode is a download mode in which the signage terminal downloads delivered signage content;
receiving, by a delivery controller, an instruction to deliver the signage content to the signage terminal that is the delivery target,
determining, by the delivery controller, whether or not to deliver the signage content immediately based on a delivery priority policy for every signage terminal that downloads the signage content, wherein the delivery priority policy that defines a priority of delivery to the signage terminal in accordance with the status of the signage terminal is retained in advance,
performing immediately, by the delivery controller, the delivery to the signage terminal, which is the first mode, and
determining, by the delivery controller, to postpone the delivery to the signage terminal, which is the second mode.

* * * * *